United States Patent [19]

Pattison

[11] 4,041,229
[45] Aug. 9, 1977

[54] POLYMERIC FLUOROMETHYLATED DIENES

[75] Inventor: Victor A. Pattison, Clarence Center, N.Y.

[73] Assignee: Hooker Chemicals & Plastics Corporation, Niagara Falls, N.Y.

[21] Appl. No.: 739,760

[22] Filed: Nov. 8, 1976

Related U.S. Application Data

[63] Continuation-in-part of Ser. No. 656,219, Feb. 9, 1976, Pat. No. 4,004,073, which is a continuation of Ser. No. 411,869, Nov. 1, 1973, abandoned, which is a continuation-in-part of Ser. No. 788,009, Dec. 30, 1968, abandoned.

[51] Int. Cl.$^2$ .................. C08F 136/16; C08F 136/18
[52] U.S. Cl. ................................ 526/249; 526/173; 526/229; 526/232; 526/252
[58] Field of Search ............... 526/249, 252, 173, 229, 526/232

[56] References Cited

U.S. PATENT DOCUMENTS

| | | | |
|---|---|---|---|
| 3,035,034 | 5/1962 | McKrisick et al. | 260/92.1 R |
| 3,148,175 | 9/1964 | Barr | 260/92.1 R X |
| 3,607,850 | 9/1971 | Smith | 260/92.1 R X |

OTHER PUBLICATIONS

Plakhova et al., Chem. Abstracts (1962), vol. 57, col. 13596e.
Polymerization Studies Leading to High Strength Chem. Resist. Elastomers; Relyea et al. (Cont. No. DA 19-129-AMC-487(n) for U.S. Army Natick Labs., by Uniroyal 6-1967.

Primary Examiner—William F. Hamrock
Attorney, Agent, or Firm—Peter F. Casella; William R. Devereaux

[57] ABSTRACT

Polymers and copolymers of

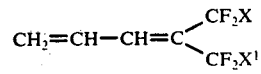

are disclosed, wherein X and X$^1$ are halogen.

14 Claims, No Drawings

POLYMERIC FLUOROMETHYLATED DIENES

REFERENCE TO PRIOR APPLICATION

This is a continuation-in-part of application Ser. No. 656,219, filed Feb. 9, 1976, now U.S. Pat. No. 4,004,073, issued Jan. 18, 1977 which is a continuation of application Ser. No. 411,869, filed Nov. 1, 1973, now abandoned, which is a continuation-in-part of application Ser. No. 788,009, filed Dec. 30, 1968, now abandoned.

This invention relates to novel fluoromethylated compounds and processes for producing such compounds. More particularly, this invention relates to polymers and copolymers of fluoromethylated butadiene.

The polymers of the present invention are those obtained by polymerizing monomers of the general formula

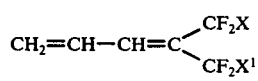

wherein X and $X^1$ are halogen, either alone in a homopolymerization reaction, or in the presence of at least one other dissimilar monomer copolymerizable therewith.

The fluoromethylated diene monomer may be readily prepared by reacting a fluoroacetone of the formula

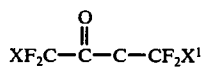

wherein X and $X^1$ are as previously defined, with propylene, in the presence of a Friedel-Crafts cataylst, to yield an intermediate fluoromethylated alkenol of the formula

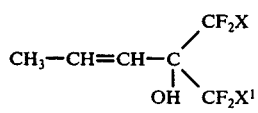

wherein X and $X^1$ are as previously defined. The resulting alkenol is then dehydrated to yield the monomeric butadiene. Depending upon whether or not it is desired to isolate the intermediary alkenols, the two steps of the reaction may be carried out separately or together; that is, the dehydration agent may optionally be added to the olefinfluoroacetone adduct without purification of the alkenols.

The fluroacetone-olefin adduct is prepared by combining fluoroacetone and the appropriate olefin in a molar ratio of up to a 100 mole excess of either reactant, although a ratio of from 1:1 to 1:2 is preferred. Optionally, a solvent may be utilized. Convenient solvents for the reaction include hexane or pentane, or other appropriate solvents inert to the conditions of the reaction. The reaction is carried out in the presence of a conventional Friedel-Crafts cataylst and at a temperature within the range of from $-100°$ to about $50°$ C, preferably from about $-50°$ to about $0°$ C.

Aluminum trichloride is an effective catalyst. Other suitable Friedel-Crafts type catalysts include boron trifluroride, tin chloride, zinc chloride, antimony fluroide and other aluminum halides.

The intermediate fluoromethylated alkenols are conveniently isolated from the reaction mixture by fractional distillation.

The reaction of fluoroacetones with the propylene evidently occurs with an alkyl rearrangement to form, as previously stated:

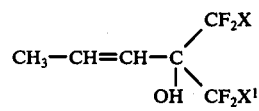

The adductive step provides a product comprised primarily of the stable trans isomer of the 2-alkenol, with the relatively unstable cis isomer present only in trace amounts. The ismoers may be separated, if desired, by suitable gas chromatography procedures.

If isolation of the intermediate fluoromethylated alkenol is not desired, the dehydration agent may be added directly to the reaction mixture containing the fluoroactone-olefin adduct.

To obtain the dehydration product, the dehydration agent is added after the adductive step of the reaction is complete and the reaction mixture has been heated to from about $20°$ to $300°$ C, preferably from about $50°$ to $150°$ C. Suitable dehydration agents include phosphorus pentoxide and concentration sulfuric acid. While the dehydration agent may be added in proportions ranging from about 0.2 to 1000 moles per mole of fluoromethylated alkenol, the reaction is most efficiently carried out with an excess of the dehydration agent of from about 10 to about 30 moles per mole of alkenol present.

The polymerizable dehydration product is predominantly 1,1-bis(halodifluoromethyl)-1,3-butadiene although minor amounts of 1,1-bis-(halodifluoromethyl) - tetrahydrofuran may be present. The conditions are controlled so that polymerization of the product is not induced prematurely.

The fluoromethylated butadiene may be polymerized or copolymerized with one or more monomers copolymerized therewith by conventional methods. The polymers and copolymers are useful as coating compositions, and are particularly valuable for their ability to confer water and oil repellency to fibrous materials coated therewith.

The homopolymers and copolymers of the fluoromethylated butadiene are characterized by the repeating units

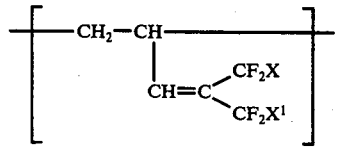

in the skeletal chain, wherein X and $X^1$ are as previously defined.

Homopolymerization of the fluromethylated butadienes may be effected by polymerization methods known in the art, for example, by emulsion, solution, bulk or suspension techniques, with free radical generators such as benzoyl peroxide, alkali metal persulfates or the like are preferably used to initiate the polymerization reaction.

The monomers may be copolymerized with vinyl monomers such as styrene, acrylamide, acrylonitrile, ethyl acrylate, isoprene, haloprene, methylstyrene, vinyl pyrrolidone, vinyl halides, methyl methacrylate and methacryl halides. As indicated above, 1,2 polymerization of the fluoromethylated butadiene occurs at the non-substituted double bond position as evidenced by infrared C=C stretching absorportion at 1680 cm$^{-1}$ for copolymers of the fluoromethylated diene and a copolymerizable monomer such as isoprene, ethyl acrylate, styrene, or acrylonitrile.

Particularly efficacious as oil and water-proofing agents are styrene-fluoromethylated butadiene copolymers and the acrylamide-fluoro-methylated butadiene copolymers.

The examples which follow are provided to more clearly illustrate the nature of the present invention. All parts and percentages are by weight, and all temperatures are in degrees centigrade, unless otherwise specified.

EXAMPLE 1

PREPARATION OF PROPYLENE — HEXAFLUORO ACETONE ADDUCTS

A mixture of 166 parts of fluoroacetone, 84 parts of propylene and 2 parts aluminum chloride in 1630 parts of pentane was allowed to warm slowly from −30°. At about −15° there was a gentle exotherm after which the reaction was stirred for 1 hour at ambient temperatures, then washed with 5 percent hydrochloric acid, dried over sodium sulfate and distilled (18 inch Vigreaux) to yield 150 parts (72 percent) of product boiling at 97°–100°. The composition of this product is 60 percent trans-1,1-bis(trifluoromethyl)-2buten-1-ol, 3 percent cis-1,1-bis(trifluoromethyl)-2-buten-1-ol and 37 percent 1,1-bis (trifluoromethyl)-3-buten-1-ol. Elemental analyses, infrared and nuclear magnetic resonance spectra confirmed the identity of the products.

EXAMPLE 2

PREPARATION OF PROPYLENE - CHLOROPENTAFLUOROACETONE ADDUCTS

The process of Example 1 was repeated using 182 parts of chloropentafluoroacetone and 84 parts propylene yielding 82 percent (184 parts) of product boiling at 120°–130°. A mixture of isomers corresponding to that obtained in Example 1 was obtained. Elemental analyses, infrared and nuclear magnetic resonance spectra confirmed the identity of the product.

EXAMPLE 3

PREPARATION OF FLUOROMETYLATED DIENE

A mixture of alkenols (272 parts) prepared in Example 1 from propylene and hexafluoroacetone and 740 parts of concentrated sulfuric acid were placed in a distillation flask fitted with a magnetic stirrer and an 8 inch Vigreaux column. The temperature of the reaction mixture was slowly raised until clear liquid started to distill at about 100°. The temperature was held at 100°–110° while 150 parts (59 percent) of essentially pure 1, 1-bis(trifluoromethyl)-1,3-butadiene distilled at 75°. This product was redistilled at 70°–72°. Elemental analyses, infrared and nuclear magnetic resonance spectra confirmed the identity of the product.

EXAMPLE 4

PREPARATION OF 1-CHLORO-1,1-DIFLUORO-2-TRIFLUOROMETHYL-2,4-PENTADIENE

The process of Example 3 was repeated using 22.4 parts of the propylenechloropentafluoroacetone adduct prepared in Example 2 which was distilled slowly from 90 grams of concentrated sulfuric acid at 50 mm pressure. The distillate (12 parts) was dissolved in ether, washed with 5 percent sodium hydroxide solution, then washed with water and dried over sodium sulfate. Distillation (8 inch Vigreaux) effected 1-chloro-1,1-difuoro-2trifluoromethyl-2,4-pentadiene boiling at 101°–102°. Elemental analyses, infrared and nuclear magnetic resonance spectra confirmed the identity of the product.

EXAMPLE 5

BULK POLYMERIZATION OF 1,1-BIS-(TRIFLUOROMETHYL)-1,3-BUTADIENE

A mixture of 1.90 parts of 1,1-bis-(trifluoromethyl)-1,3-butadiene and 0.010 parts of benzoyl peroxide was placed in a vessel, flushed with nitrogen and heated at 60° for 66 hours. The reaction mixture was stripped of its monomer by heating at 110°/1 mm for 1 hour. The polymeric residue obtained in essentially quantitive yield had a molecular weight of 4500. Infrared spectra confirmed the identity of the product.

EXAMPLE 6

EMULSION POLYMERIZATION OF 1,1-BIS-(TRIFLUOROMETHYL)-1,3-BUTADIENE

A mixture of 11.8 parts of 1,1-bis-(trifluoromethyl)-1,3-butadiene, 34 parts of water, 0.060 parts of potassium persulfate and 0.36 parts of sodium lauryl sulfate was placed in a vial, flushed with nitrogen and heated with vigorous stirring at 50°–60° for 20 hours. Evaporation of the water from the resultant emulsion gave a clear, tough polymer in essentially quantitative yield, having a molecular weight of 83,000. A clear, water-white tough film was cast from its acetone solution. The infrared spectrum is similar to that from the product prepared as in Example 5 by bulk polymerization.

EXAMPLE 7

PREPARATION OF COPOLYMER OF 1,1-BIS-(TRIFLUOROMETHYL)-1,3-BUTADIENE AND ACRYLAMIDE

The emulsion polymerization process of Example 6 was repeated using equimolar quantites of 1,1-bis-(trifluoromethyl)-1,3-butadiene and acrylamide. A high molecular weight 1:1 copolymer of 1,1-bis-(trifluoromethyl)-1,3-butadiene and acrylamide was obtained.

EXAMPLE 8

PREPARATION OF A METHYLOLATED COPOLYMER OF 1,1-BIS-(TRIFLUOROMETHYL)-1,3-BUTADIENE AND ACRYLAMIDE

A mixture of 3.6 parts of acrylamide, 9.8 parts of 1,1-bis(trifluoromethyl)-1,3-butadiene, 24 parts of water, 0.06 parts of potassium persulfate, and 0.36 parts of sodium lauryl sulfate were heated and stirred at 50–60 degrees for 20 hours to form a viscous emulsion. This emulsion was diluted with 50 parts of water and brought to pH 8.0 with sodium carbonate. At this point 8.5 parts of 37 percent formaldehyde was added, and the emulsion was stirred overnight at ambient temperatures to produce a resin which is a methylolated 1:1 copolymer of 1,1-bis(trifluoromethyl)-1,3-butadiene and acrylamide.

EXAMPLE 9

PREPARATION OF COPOLYMER OF 1,1BIS (TRIFLUOROMETHYL)-1,3-BUTADIENE AND ACRYLONITRILE

This emulsion polymerization process of Example 6 was repeated using equimolar quantites of 1,1-bis(trifluoromethyl)-1,3-butadiene and acrylonitrile. A high molecular weight 1:1 copolymer of 1,1-bis(trifluoromethyl)-1, 3-butadiene and acrylonitrile was obtained. A clear, water-white, tough film was cast from its acetone solution. In frared spectra confirmed the structure of the polymer.

EXAMPLE 10

PREPARATION OF COPOLYMER OF 1,1-BIS (TRIFLUOROMETHYL)-1,3-BUTADIENE AND STYRENE

The emulsion polymerization of Example 6 was repeated using equimolar quantities of 1,1-(trifluoromethyl)-1,3-butadiene and styrene. A high molecular weight (163,000) 1:1 copolymer of 1,1-bis(trifluormethyl)-1,3-butadiene and styrene was obtained. A clear, water-white, tough film was cast from its acetone solution. Infrared spectra confirmed the structure of the polymer.

EXAMPLE 11

PREPARATION OF COPOLYMER OF 1,1-BIS (TRIFLUOROMETHYL)-1,3-BUTADIENE AND ETHYL ACRYLATE

The emulsion polymerization process of Example 6 was repeated using equimolar quantities of 1,1-bis(trifluoromethyl)-1, 3-butadiene and ethyl acrylate. A high molecular weight (110,000) 1:1 copolymer of 1,1-bis(trifluoromethyl)-1,3-butadiene and ethyl acrylate was obtained. A slightly opaque, nearly water-white film was cast from its acetone solution. Infrared spectra confirmed the structure of the polymer.

EXAMPLE 12

PREPARATION OF COPOLYMER OF 1,1-BIS (TRIFLUOROMETHYL)-1,3-BUTADIENE AND ISOPRENE

The emulsion polymerization process of Example 6 was repeated using equimolar quantities of 1,1bis(trifluoromethyl)-1,3-butadiene and isoprene. A high molecular weight (173,000) 1:1 copolymer of 1,1-bis(trifluoromethyl)-1,3-butadiene and isoprene was obtained. A slightly opaque, elastomeric film was cast from its acetone solution. Infrared spectra confirmed the structure of the polymer.

It is to be understood that the details provided in the foregoing specification can be modified by those skilled in the art without departing from the scope of the invention.

I claim:

1. A copolymer of a halomethylated diene of the formula

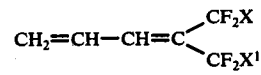

wherein X and $X^1$ are halogen and a monomer copolymerizable therewith, said copolymer being characterized by the repeating units

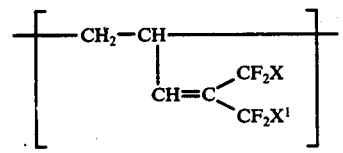

in the skeletal chain, and produced by the process comprising allowing said halomethylated diene and said copolymerizable monomer to copolymerize by the use of a free radical catalyst.

2. A copolymer according to claim 1 wherein X and $X^1$ are fluorine.

3. A copolymer according to claim 1 wherein X is chlorine and $X^1$ is fluorine.

4. A copolymer produced by the process according to claim 1 wherein said free radical catalyst is an alkali metal persulfate.

5. A copolymer produced by the process of claim 1 wherein said free radical catalyst is benzoyl peroxide.

6. A copolymer according to claim 1 wherein said copolymerizable monomer is acrylamide.

7. A copolymer according to claim 6 wherein said copolymer is a methylolated copolymer.

8. A copolymer according to claim 1 wherein said copolymerizable monomer is styrene or methylstyrene.

9. A copolymer according to claim 1 wherein said copolymerizable monomer is an alkyl acrylate or alkyl methacrylate.

10. A copolymer according to claim 1 said wherein said copolymerizable monomer is isoprene or a haloprene.

11. A copolymer according to claim 1 wherein said copolymerizable monomer is a methacryl halide.

12. A copolymer according to claim 1 wherein said copolymerizable monomer is a vinyl halide.

13. A copolymer according to claim 1 wherein said copolymerizable monomer is a vinyl pyrrolidone.

14. A copolymer according to claim 1 wherein said copolymerizable monomer is acrylonitrile.

* * * * *

UNITED STATES PATENT OFFICE
CERTIFICATE OF CORRECTION

Patent No. 4,041,229          Dated August 9, 1977

Inventor(s) Victor A. Pattison

It is certified that error appears in the above-identified patent and that said Letters Patent are hereby corrected as shown below:

Column 2, line 17, change misspelled "ismoers" to --- isomers ---.

Column 5, line 29, change "1,1-(trifluorme-" to --- 1,1-(trifluorome- ---.

Claim 10, column 6, line 48, change "said wherein" to --- wherein ---.

Signed and Sealed this

Fourth Day of April 1978

[SEAL]

Attest:

RUTH C. MASON
Attesting Officer

LUTRELLE F. PARKER
Acting Commissioner of Patents and Trademarks